March 7, 1950     O. A. BERGMAN     2,499,450
SELECTOR APPARATUS FOR COLOR
AND OTHER COMBINATIONS
Filed Feb. 13, 1947     4 Sheets-Sheet 2
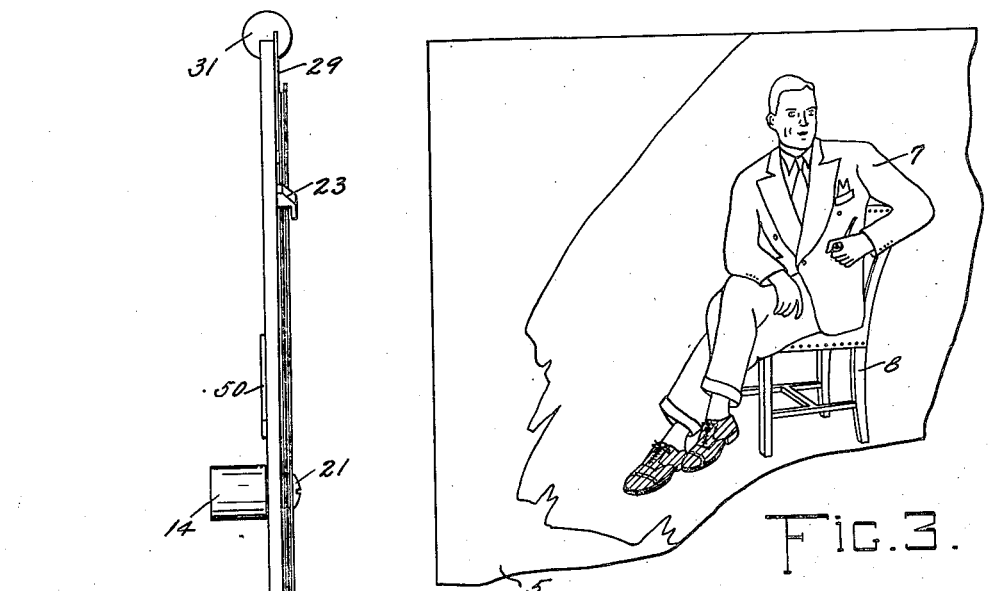
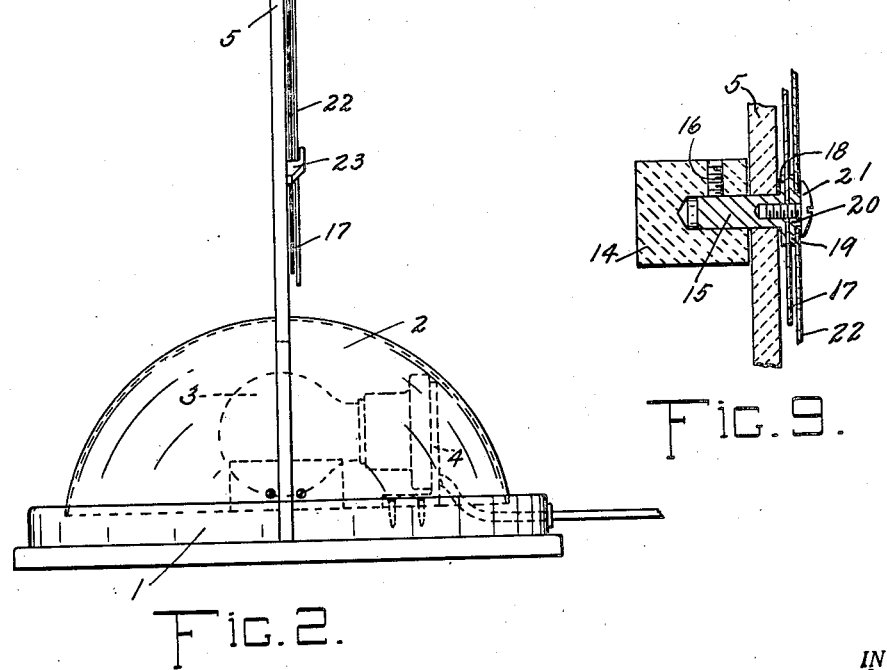
INVENTOR.
O. A. Bergman
BY Robb & Robb
Attorneys March 7, 1950

O. A. BERGMAN
SELECTOR APPARATUS FOR COLOR
AND OTHER COMBINATIONS 2,499,450

Filed Feb. 13, 1947

INVENTOR.
O. A. Bergman
BY Robbins Robb
Attorneys

March 7, 1950

O. A. BERGMAN
SELECTOR APPARATUS FOR COLOR
AND OTHER COMBINATIONS 2,499,450

Filed Feb. 13, 1947

INVENTOR.
O. A. Bergman
BY Robb & Robb
Attorneys

Patented Mar. 7, 1950

2,499,450

UNITED STATES PATENT OFFICE 2,499,450

SELECTOR APPARATUS FOR COLOR AND OTHER COMBINATIONS

Oscar A. Bergman, Shaker Heights, Ohio

Application February 13, 1947, Serial No. 728,349

7 Claims. (Cl. 35—56)

My invention comprises novel guide or selecting means or apparatus for ensuring the use of proper color, structure, and other combinations, that may be desired to be associated with each other for many different purposes from the standpoint of the aesthetic, commercial objectives, sales advantages, or the like.

While my invention as herein set forth deals primarily with the art of stylish dressing, or dressing in good taste by the use of proper color combinations of wearing apparel, it is not, as indicated above, limited to such objective, as later pointed out herein.

It is well known, by way of indicating the utility of my novel apparel or color selecting apparatus or device, in the field of clothing selection, that many people do not have a correct sense of selection of garments or apparel of different or matching colors which they wish to wear. Thus, a man may use a suit of clothes of a color quite appropriate to the color of his hair, we will say, and yet wear with such suit a shirt, or tie, or hose, or all of such articles, of a color or colors wholly incorrectly combined, or unsuitable to the particular coloring of the individual himself having in mind primarily the color of his hair, and also inappropriately used with the particular suit. For instance, a man having red hair should never wear a red tie, or a shirt having pink or reddish hues. Generally, it is sartorially improper to wear a blue tie with a green shirt, red socks with an orange colored shirt, a brown necktie and shirt with a blue suit, and so on.

Therefore, I have for one adaptation of my invention devised an apparatus which by employment of mere mechanical facilities, will be operable to present to vision representations of articles of wearing apparel of different kinds and colors, such as selected ones of suits, shirts and neckties, hose, handkerchiefs, etc., the colors of which, if appropriately combined from a sartorial viewpoint, incident to the manipulation of such representations, will signal such condition. If, however, any one or more of the representations, when thus brought into association, create an infraction of the rules of appropriate color combination, such condition will be apparent due to the action of the said signaling means, which is preferably visual.

To the above end, my selector apparatus for clothing color selecting and combining purposes preferably includes a support or panel depicting transparently the outline of the figure of a person (man), a movable carrier or dial adapted to present to vision coinciding with such figure any one of several representations of suits of different common base colors, as if draped on the figure, a second carrier or slide having thereon representations of heads with different colors of hair each presentable at the head outline of the depicted figure, and a third carrier or dial. This third dial bears a series of differently colored representations of articles such as a shirt and tie, hose, handkerchief, related in diverse color combinations, associated ones of which may be brought into their proper positions visible at the figure outline referred to. Additionally, I provide visual signal means on this last carrier or dial such that if the several carriers are moved to bring together at the figure outline or window associated separate ones of the variously colored articles depicting the completely dressed person, the color combinations of which articles are proper, so to speak, the signal means will indicate at another suitable window or vision opening that the articles of such colors may be used properly together; otherwise failure of such signal indication to appear will advise the person using the apparatus that the said combination is improper due to incongruity of the color combinations employed. The action of the signaling means could be vice versa to that above stated, of course.

A selector and indicating apparatus such as described above, involving color combinations, is very useful to have available for operation, in larger sizes in department, tailoring, and haberdashery stores, or the like; in small sizes it may be supplied to persons for individual use and will be of great advantage to those who cannot rely on their own sense of selection of appropriate colors for combining wearing apparel articles. Again, it may suggest proper color combinations which many persons would never originate.

But it is notable that my invention may be used in connection with problems of properly combining other articles of different colors, such as articles of furniture or furnishings, including chairs, davenports, love seats, tables and covers, draperies, etc., or such articles as might be arranged in a room or other similar place.

Again, where the situation is one of properly associating different things from a structural aspect, such as items of furniture of different periods, my invention, by employing different representations than those previously recited, may be readily adapted to such purposes as will be evident upon understanding the construction thereof as later detailed herein.

3

In the drawings:

Figure 2 is an end elevation of the apparatus, dotted lines illustrating the location of a light which may or may not be used in conjunction with my invention.

Figure 3 is a fragmentary view of the upper portion of the main panel or support, showing the transparent main object window as outlined therein by lines delineating the general shape of the object and permanent illustration of parts, notably shoes.

Figure 9 is a vertical sectional view taken through the central portion of the apparatus and bringing out the manner of mounting the movable charts or dials on the main panel or support and the manipulating handle or knob which is used for the main object dial as showing operating and supporting connections of these various parts.

Figure 4:
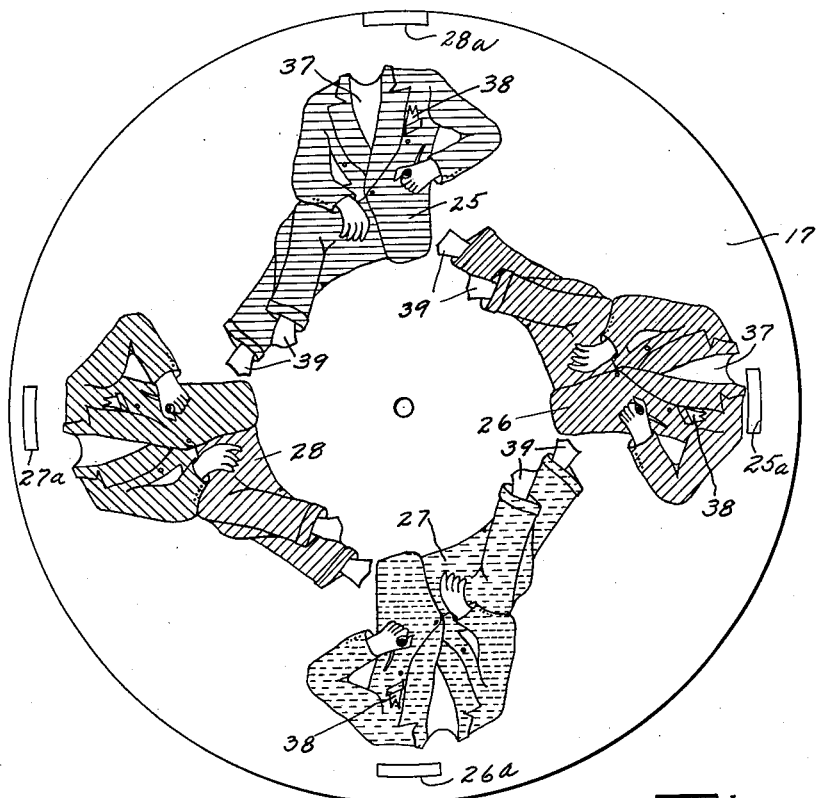
Figure 4 is a view in elevation or plan of the main object dial or chart.

Describing the construction and illustrative manner of my apparatus, in one preferred form thereof, and referring to the drawings, I note that the apparatus consists of a base 1 which may be of approximately circular form and upon which base is carried a generally semi-spherical housing 2 made up of sections spaced from each other and adjacent portions thereof, as seen in Figure 4. The housing 2 performs two functions in the apparatus shown in that within the housing there may be arranged an electric light 3 mounted in any suitable manner upon a support 4 and connected by suitable wiring to a plug that may be attached to any electric output socket or other source of supply of current. Secondarily, the housing 2 receives and supports in an upright condition between the sections thereof the vertical panel or support 5, the lower middle portion of which is cut out as seen at 6 to form a clearance space for the light 3, suitable blocks 6a being attached to the base 1 to snugly fit against the opposite sides of the lower side portions of the panel 5 to support the sections of the housing 2 in maintaining the panel in an upright position. The lower edges of the sections of the housing 2 may be received by a circular groove formed in the top surface of the base 1 for accurate emplacement of the housing on the base.

While I describe my invention incident to the use of an upright panel or support 5, it is quite within the purview of said invention that this panel or support may be disposed horizontally to be carried flat upon a table, or in an inclined position, so far as the operative features of my invention are concerned.

The panel 5 may be made of an opaque plastic material, or opaque board material of any kind, though if the light 3 is employed, an opaque or translucent material will preferably be used so that the light rays from the light 3 may pass upwardly and diffuse in the plane of the panel 5 at its lower portion above the housing 2. In many instances, however, in practical use of my apparatus the light 3 may be entirely dispensed with.

Figure 7:
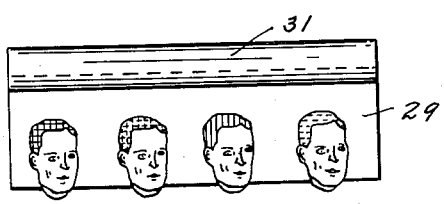
Figure 7 is a detail view in elevation of the head associated object slide.
Figure 8:
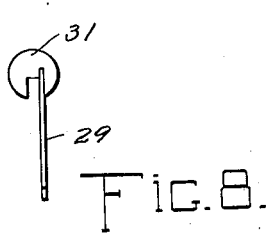
Figure 8 is an end view of the feature of Figure 7.

At a suitable place on the panel 5 I provide a transparent main object window designated generally at 7 and illustrated as having the outline of a figure of a man, superficial illustration being applied to the front of the panel in the form of a chair 8 on which the main object outline or figure 7 is depicted as showing the figure seated on the chair. The main object window 7 may be provided with outlining indicia to show in a general way the apparel of the man, but the body of the window as generally outlined is transparent, as stated. Preferably, the figure of the man as illustrated has the shoes of the figure outline permanently shown in color, in the present instance brown, and in this portion of the figure the showing of the shoes is, of course, opaque.

Any suitable decorative indicia may be provided on the panel or support 5 and when the invention is used for apparel color selection there may be provided style illustrations of hats, such as that designated 9, and style illustrations for shoes designated 10, these being immaterial to the invention.

In addition to the indicia above referred to, I provide visual instructions generally designated at 11 having to do with the operation of my invention to be later more fully referred to and likewise I provide, preferably at the right side of the panel or support 5, a signal window 12 which is composed of a transparent portion of the body of the panel so that signal or signalling indicators at the rear of the panel may be visible through this window 12. The window is preferably divided by vertical and cross lines into sections for a purpose more fully to be referred to hereinafter, but the horizontally divided portions of the window are associated with indicia descriptive of the color of the hair of different persons such as the following inscriptions: "Dark hair," "Light hair," "Red hair," and "Gray hair," these inscriptions generally designated 13.

At approximately the central portion of the panel 5 I provide a turning handle 14 which is affixed to a spindle 15 by means of a holding screw 16, and this spindle extends at its rear end through the panel 5 to provide a mounting means for supporting a main object chart, dial or wheel, 17. The dial 17 is circular in form and has a central opening through which a screw 21 passes, an inner shoulder 18 being formed on the spindle and an outer washer 19 being also carried thereby so that the dial 17 is received between the shoulder 18 and washer 19, the washer 19 having a shoulder portion 20 thereon. The attaching screw 21 has its head bearing against the shoulder 20 of the washer 19 to clamp the dial 17 between the washer and said shoulder 18 of the spindle 15 so that the dial 17 rotates with the spindle. The head of the screw 21 is spaced from the main body of the washer 19 to afford a space or annular groove for receiving the central axis portion of a secondary associated object chart, dial, or wheel 22 prevented from displacement, of course, from the spindle 15 by the head of the screw 21, but permitting free rotation of this secondary chart or dial member 22 relatively to the panel 5 and relatively to the primary or main object chart or dial member 17. For facilitating the holding of the primary and secondary dials or chart members 17 in fairly close relation to the back of the panel 5, guide brackets 23 may be located on the panel 5 at its rear side to overlie at their inner ends the parts 17 and 22, with the latter freely rotatable in relation to the brackets.

From the foregoing, since the turning handle or knob 14 is fixed to the spindle 15 and the chart or dial member 17 is substantially clamped to the spindle 15 by the parts 18 and 19, the rotation of the knob or handle 14 will enable the corresponding rotation of the member 17 without effecting movement of the member 22 for manipulating the member 22 to effect rotation thereof. Said member 22 is mounted upon the panel 5 so that its periphery will project slightly as at 22a from the right side of the panel enabling engagement of the fingers with the periphery of the dial member 22 for effecting rotation of the member 22 relatively to the panel 5 and relatively to the primary dial member 17.

As shown best in Figure 4, it will be seen that the member 17 is provided with illustrative matter in the form of differently colored suits depicted in their arrangement as if draped about a seated person, the outlines of the suits afforded by the colors thereof being of a size to correspond with the size of the window 7 of the panel 5 when any selected one of these suits of various colors is caused to be disposed at the rear or opposite the window 7 by appropriate rotation of the main object chart or dial member 17 to thus make a complete picture.

By reference to Figure 4, it will be seen that four main object illustrations are provided in my particular construction of apparatus as depicted, the suit illustration 25 being of the color blue, that designated 26 having the color brown, the one designated 27 being of a gray color, and that designated 28 being a combination color outfit involving a green coat and brown trousers. Associated with the said main object illustrations 25, 26, 27, and 28 are certain signal windows designated 25a, 26a, 27a and 28a. These windows are constituted by cut-out portions of the dial 17 and the window which coacts with a particular main object or suit illustration is located at 90° in a clockwise direction from said associated illustration and adjacent to the periphery of the dial 17. Thus, the window 25a which becomes operative for use in connection with the blue suit or object 25 is located as above described and is outwardly disposed in relation to the brown suit or main object illustration 26. The window 26a which is operative for use with the brown suit or object 26 is located outwardly toward the periphery of the dial 17, in relation to the gray suit or main object illustration 27, and so on around the dial.

The foregoing generally sets forth the construction of my main object chart or dial 17. It remains to be noted, however, that there is sufficient space outwardly of each of the main object illustrations 25, 26, 27 and 28 to enable a head illustration to be located at the head cut-out portion of the outline window 7.

Figure 1:
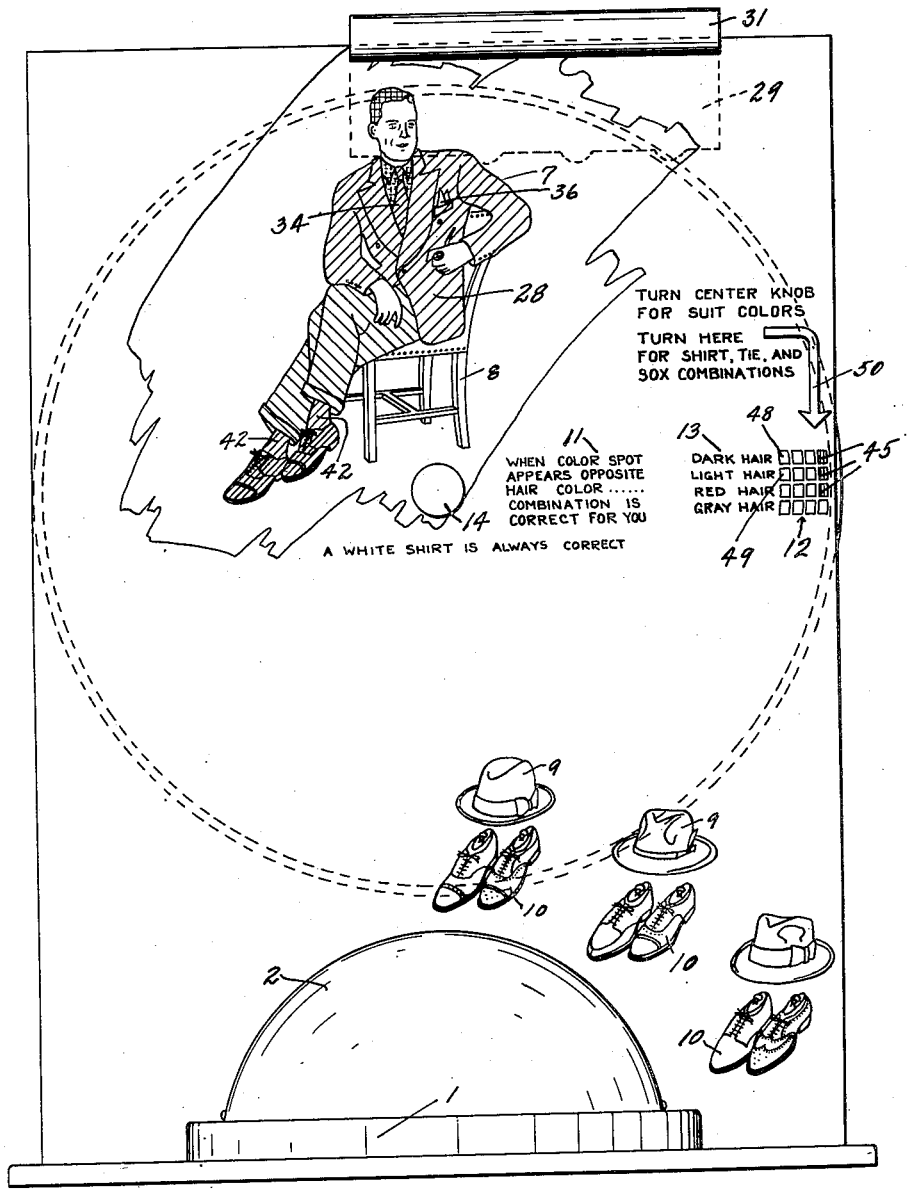
Figure 1 is a front elevation of my apparatus with the parts adjusted in the manner obtained by one special operation thereof.

With the foregoing in mind, I provide at the top of the panel 5 a slide or sliding carrier member 29 which bears the illustrations of four heads, in this instance heads of a man, each illustration of the head showing a color of hair different from the color of hair used for the other illustrations. For the purposes of my invention as herein disclosed, the hair of the four head illustrations 30 will be dark hair, light hair, red hair, and gray hair, the hair of persons being ordinarily classified or susceptible of classification in the above four categories. The head slide member 27 is supported by a slide handle 31 which is provided with a groove on its under side for receiving the upper edge of the panel 5 and the head slide 29 itself is fixedly secured against the front side of the groove and at the front side of the panel 5 so that by movement of the panel 31 with the slide 29 under suitable manipulation any one of the head illustrations 30 may be caused to assume a position in rear of the head outline portion of the window 7 previously described, which illustration is best shown by itself in Figure 3 of the drawings to make a complete picture. In Figure 1 of the drawings the slide 29 is so adjusted as to present at the window 7 the head of a dark haired man.

While only four main object or suit illustrations are provided on the dial or chart member 17, it is obvious that an increased or less number of such illustrations may be utilized in accordance with the invention, dependent upon the whim or the extent of added utility that might be sought in the practical carrying out of my objectives.

Figure 5:
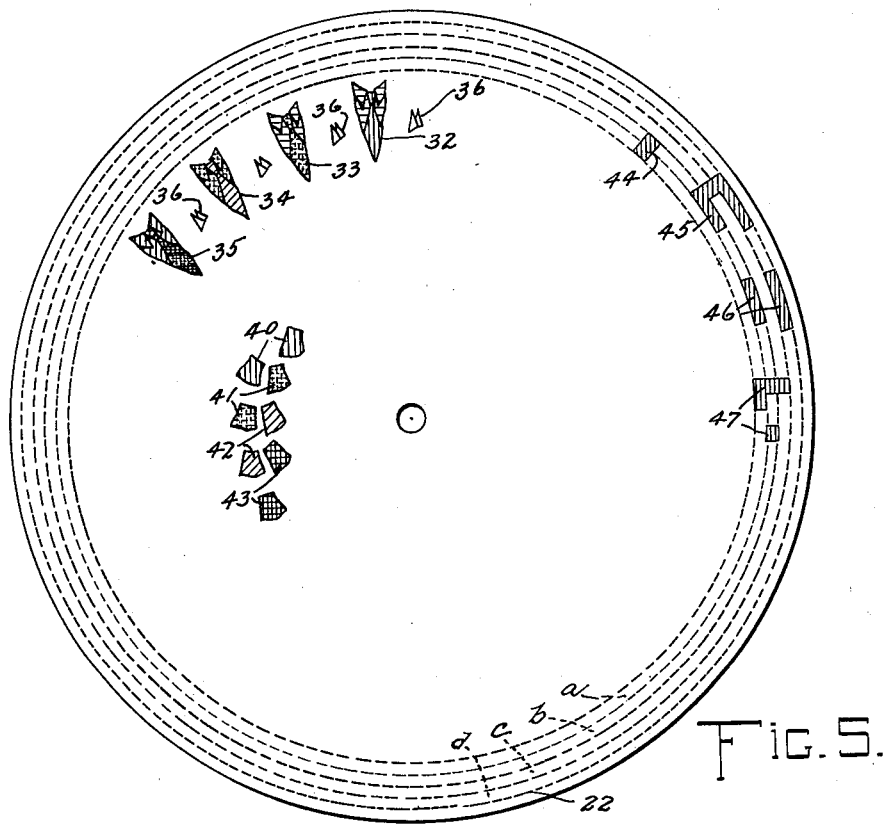
Figure 5 is a plan or front elevational view of the associated object chart or dial.
Figure 6:
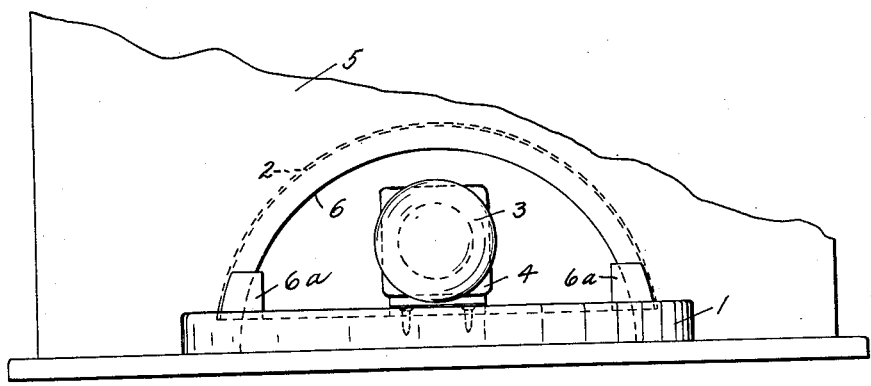
Figure 6 is a fragmentary view of the lower portion of my apparatus as viewed from the front, the front section of the housing removed to show the light arrangement more clearly.

I next pass to the specific construction of the rearmost dial or chart member 22 containing thereon illustrations of objects to be associated with those of the main object dial or chart member 17 to make a complete picture. As seen in Figure 5 which shows the chart or dial member 22 alone and in front elevation, this member bears upon its face associated object illustrations of different kinds. In the first place, there will be a set of such illustrations generally designated for the purposes hereof as 32, 33, 34, and 35, each of these illustrations comprising a showing of a shirt of a certain color and a necktie of a certain color, usually of colors which properly blend and which may be suitably used for wearing apparel in combination with suits of certain colors and dependent of course upon the color of hair of the persons wearing same. The associated object illustrations just mentioned are shown as only four in number in the illustration of my invention, the same being arranged circularly on the surface of the member 22 spaced from the periphery of said member, and each capable of being located at the window 7 suitably adjusted to what may be called the shirt and necktie position in relation to the outline of the suit at the window 7 and likewise in proper relation to any suit illustration such as those designated 25 to 28 inclusive. It is contemplated, of course, that the associated object illustrations just mentioned and others which will be presently described will be provided entirely around the dial or chart on the surface thereof. For developing the principle of construction of my invention and operation thereof I have only depicted four of such illustrations suitable to be combined in various ways with the various suit or main object illustrations 25 to 28 above mentioned.

Other associated object illustrations that may appear at the window 7 in proper relation to the suit are the so-called handkerchief illustrations 36, and, while the latter are illustrated as white, it is contemplated that they may be shown in different colors should such be desired.

It should be remembered, in reference to the suit or main object illustrations 25 to 28 inclusive, that the dial 17 is provided with transparent portions designated 37 at the shirt section, 38 at the handkerchief or pocket section, and 39 at the sock or hose sections of the illustration. Thus, owing to the arrangement of these transparencies or transparent sections, the shirt and tie associated object illustrations 32, 33, 34, and 35 may be brought, any one, opposite the transparent section 37 of the main object illustrations mentioned, and the handkerchief associated object illustrations 36 may likewise be brought opposite the transparent section 38 of the illustrations 25 to 28 inclusive. In a similar manner, the chart or dial 22 carries associated object illustrations of various colors which I call sock or hose illustrations, the sets of which are designated 40, 41, 42, and 43. There is a pair of socks associated object illustrations in each set, the same adapted to appear opposite the socks transparent sections 39 of the main object illustrations 25 to 28 inclusive. These associated object illustrations 40 to 43 inclusive are indicated as of various colors on my drawings. I have only shown four sets of the illustrations 40 to 43 inclusive because these are the particular socks illustrations that will be combined with the associated object illustrations 32 to 35 inclusive when the latter are individually adjusted to a position opposite the shirt transparent section 37 of the illustrations 25 to 28 inclusive.

Now since it is an object of my invention that the various main object illustrations 25 to 28 inclusive shall be associated with various ones of different associated object illustrations such as 32 to 35 inclusive, 36, and 40 to 43 inclusive, with means to indicate or signal when the color combinations are appropriately arrived at, I provide signalling means which includes the signalling windows 25a to 28a, previously referred to, established by cut-out portions of the dial 17 or transparent portions (it makes no difference), the signal window 12 previously referred to having the sections opposite the indicia 13 and signal members 44, 45, 46 and 47 located on the face of the dial or chart member 22 outwardly of the associated object illustrations previously described, and of different shapes, for a purpose to be later understood in describing the operation of my invention. Effectively speaking, however, these signalling members 44 to 47 inclusive are really colored areas on the dial or chart 22, which areas, as depicted, are of the color red and may be said to comprise single block sections merging together or separating, located adjacent the periphery of the dial 22 and disposed on peripheral lines or paths enabling the signal members to be presented in front of the window 12 of the panel 5 by becoming visible through one or more of the windows 25a to 28a inclusive, dependent upon the relative adjustments of the two dials 17 and 22 as regards their rotatively adjusted positions behind the panel 5 and the windows 25a to 28a.

As seen in the illustration of the chart or dial 22, the shirt illustration 32 depicts the shirt as light blue, combined with a red necktie. The illustration 33 depicts the shirt as blue with a cream-colored or light yellow necktie. The illustration 34 depicts the shirt as of cream or light yellow color, with a brown necktie, and the illustration 35 depicts the shirt as of reddish or ox-blood color with a light cream-colored or yellow necktie, striped. In like manner, the associated object illustrations of the socks, according to the sets 40 to 43 inclusive, are of various colors, the color red used for the pair 40, yellow for the pair 41, brown for the pair 42, and black for the pair 43. As was stated with reference to the associated object illustrations 32 to 35 inclusive, the illustrations 40 to 43 inclusive will extend around the entire dial 22 inwardly of those first mentioned, and the signal members 44 to 47 inclusive will be repeated all the way around the dial adjacent the peripheral portion thereof, though differently shaped or disposed.

The manner of use and the advantages of my apparatus will be understood from the following description of operation:

It will be assumed that the appearance of the transparent window 7 of the panel 5 is substantially as shown in Figure 3, and it is desired to combine a main object illustration of a certain color, a suit in the present instance, with associated object illustrations such as have been described, the latter of different colors, to obtain a sartorially correct combination of colors when these main and associated object illustrations are combined. It will be assumed that the dial 17 is manipulated by the handle knob 14 to adjust to a position opposite the window 7 the main object illustration 28 of the suit combination comprising the green coat and brown pants. This main object illustration is presented at the window as shown in Figure 1, and, since the person to be represented to wear the depicted suit will have dark hair, the head slide 29 will be moved by the handle 31 to a position bringing the depiction of the head or face with the dark hair opposite the head outline of the window 7, as seen in Figure 1 also. Next, the associated illustration of shirt and necktie designated 34, in which the shirt is of cream or light yellow color and the necktie color is brown, will be adjusted by rotation of the dial 22 manipulating its peripheral edge at the right of the window 12 is brought to position at the transparent neck section 37 of the suit or main object illustration 28. This simultaneously causes an adjustment of the associated object illustration 42, showing brown socks, to a position opposite the transparent hose section 39 of the main object illustration 28 because the associated object illustrations 42 and 34 are related in their positions spaced apart to the points 37 and 39 mentioned as transparent sections. Likewise, at the same time the white handkerchief associated illustration 36 will be brought to a position opposite the transparent section 38 of the main illustration 28, so that we have in this instance a depiction of a black haired man wearing a light green coat and brown trousers, with a light yellow or cream-colored shirt, and a brown necktie, and wearing also brown socks. This depiction is shown clearly in Figure 1 of my drawings, all parts correctly adjusted. Due to the relation of the signal members described, the red sections at the outermost portions of the signal member 46 will now become visible, incident to the positioning of the dial 22 and the dial 17, through the window 28a located at a 90° angle from the vertical axis of the window 7. The red signal indicia of the member 46, however, will appear only at the three upper and outermost of the sections of the window 12. The result of the foregoing adjustment of the parts is illustrated in Figure 1 in that the red signal indicia appears opposite the legend feature 13 and particularly opposite the legends "Dark hair," "Light hair," and "Red hair." The foregoing signalling indication advises the operator of the apparatus that the combination of colors which has been above described and which appears in regard to the main object, associated object, and brown hair head illustration, is appropriate for use, sartorially speaking, by the person manipulating the apparatus. The color combination is indicated as not appropriate for use by a person having gray hair because in the section of the window 12 opposite the "Gray hair" legend, the window appeared white, or, in other words, there was no correct red signal indication at such portion of the window 12.

Giving another illustration of the use of my apparatus, it is notable that if the parts of the apparatus are adjusted to bring the blue suit main object illustration 25 opposite the window 7 of the panel 5, a manipulation of the dial 22 for associated object illustrations to bring to the transparent section 37 of the suit illustration 28 the associated shirt object illustration designated 32, there will appear at said transparent section a light blue shirt with a red necktie. Simultaneously there will appear at the transparent sock sections 39 of the illustration 25 associated objects in the form of socks of red color designated 40 in my drawings, and the transparent section 38 for the handkerchief of the main object illustration 25 will show a white handkerchief visible at this portion. The head slide 29 will be adjusted so that the head of a man having light hair such as illustrated at the right end of the slide 29 may be positioned at the head outline portion of the window 7. Now we have a combination of main and associated object illustrations depicting a man seated on a chair dressed in a blue suit having a blue shirt and a red necktie, red socks, and a white handkerchief, the man's head showing that he has light hair. Such a combination of main and associated object illustrations will have effected adjustments of the dials 17 and 22 in relation to the panel window 12 so that the window 25a of the dial 17 exposes certain red portions of the signal member designated 47 in my drawings. Under these conditions there will appear at the window 12 at the divided block portions 48 and 49 a red signal. Since these two blocks are opposite the "Dark hair" and "Light hair" legends of the indicia 13, the operator will be advised that the combination of colors above set forth for use in wearing apparel is correct for a dark haired person and a light haired person, but not suitable for use by a red haired person or a gray haired person. This is due to the fact, of course, by way of repetition, that only the two block sections 48 and 49 of the window 12 give the red signal indication representing approval or suitability of the color combination referred to.

Now in the operation of my apparatus, it is notable that the head slide 29 as manipulated by the handle 31 is not mechanically associated in the various cooperations of the other parts as set forth to control the signalling action of my apparatus. In other words, if in the last mentioned combination of color features of the main and associated objects, the slide 29 is adjusted so that the head of a red haired man is depicted at the window 12, the operator would be advised immediately that the color combination is not suitable for the red haired man because the red signals do not appear opposite the legend "Red hair" forming a part of the indicia 13 at the left of the window. He would then find it necessary to move the slide 29 to present at the window 7 either the head of a dark haired man or a light haired man, in which way he would know, due to the presentation of signals, that the color combination was sartorially correct. If, however, at the beginning it happened that the operator set the slide 29 so that either the head of a dark haired person or a light haired person was initially presented at the uppermost portion of the window 7, the signalling action of the apparatus as set forth at the outstart of this particular description of the use of the blue suit main object illustration would indicate the correctness of the combination of colors involved in the problem stated.

Of course I have only given two operations of my apparatus above involving two sets of adjustments for color combinations. However, it will be understood that a large multiple of combinations may be effected in view of the large number of main object and associated object illustrations and that will be and are actually used in a working apparatus of my invention, in all instances, the correctness of the color combinations being determined empirically by the proper disposition of the signalling means in relation primarily to all the associated main and associated object illustrations through cooperation between parts 5, 17 and 22.

In Figure 5 I have shown by dotted circularly arranged lines the various annular paths $a$, $b$, $c$, and $d$ on which the multiple signals, of the class of signals 44 to 47, are arranged to provide for the many associated object and main object combinations afforded by carrying out my invention. These paths $a$, $b$, $c$, and $d$ are of course related to the 25a to 28a inclusive, and also to the four divided vertical sections of the window 12 as hereinbefore described.

Having thus described my invention, what I claim as new and desire to secure by Letters Patent of the United States, is:

1. In selector apparatus of the class described, in combination, a main panel having a main window, a first movable main object chart member, and a second movable associated object chart member mounted on the panel, the first chart member bearing a plurality of main object representations of different colors presentable at said window, and the second chart member bearing object representations for mechanical association with the said main object representations at said window and of colors harmonizing and not harmonizing with the latter, and signal means on the panel and said chart members operable incident to relative adjustments of the main and associated object representations of said chart members to indicate that the colors of the said representations are in harmony.

2. In selector apparatus of the class described, in combination, a main panel having a main window, a first main object chart member, and a second movable associated object chart member mounted on the panel, the first chart member bearing a main object representation of a certain color presentable at said window, and the second chart member bearing object representations of various colors, some harmonizing and others not harmonizing for mechanical association with the said main object representation at said window, a signal space being provided on the panel, and a signal means on one of said chart members operable and visible through predisposed openings in said other chart member to thereby appear at said signal space when associated object representations of colors harmonizing with the color of the main object representation are brought into a predetermined relation respecting the latter.

3. In selector apparatus of the class described, in combination, a main panel having a main window, a first movable main object chart member, and a second movable associated object chart member mounted on the panel, the first chart member bearing a main picture object representation presentable at said window, and the second chart member bearing picture object representations for correct and incorrect mechanical association with the said main object representation at said window, and signalling means operable upon certain adjustments of said chart members to indicate predeterminedly established relations between the main and associated object representations.

4. In apparatus of the class described, in combination, a panel supporting member having a main window therein, and also a signal window; a main object dial rotative on and in rear of the panel member and carrying a series of main object representations of different colors each shiftable by movement of said dial to appear at said main window, an associated object dial on the panel member coaxial with the main object dial and bearing associated object representations of different colors to be adjusted to predetermined positions visible at the main window in relation to a selected main object representation at the main window of the panel, and signal means on said dials presentable at the signal window by the adjustment of the said dials, said signal means indicating whether the color relations between a main object representation and associated object representations harmonize in accordance with predetermined standards of color harmony.

5. Apparatus as claimed in claim 4, wherein said signal means on said main object dial comprises differently positioned signal windows, one for each main object representation thereon, the last mentioned signal windows coacting with the signal window in said panel for controlling the action of the signal means aforesaid.

6. In selector apparatus of the class described, in combination, a main panel having a main window, a first movable main object chart member, and a second movable associated object chart member mounted on the panel, the first chart member bearing a main object representation presentable at said window, and the second chart member bearing object representations for mechanical association with the said main object representation, a signal space being provided on the panel; and signal means operable by one of said chart members for presentation at said signal space incident to predetermined relative adjustments of the main and associated object representations of said chart members, combined with a movable head object representation chart, having head object representations thereon, and shiftable on said panel to present any one of its object representations at said main window.

7. A device of the class described comprising an opaque panel having a transparent representation of an object to be depicted as garbed in a plurality of items of varying hue, a primary item carrier movable in relation to said transparent representation and having representations on the surface thereof of a variety of one of said items selectively registrable with a portion of said transparent representation and visible therethrough, and a secondary item carrier movable in relation to said transparent representation and to said primary carrier and having representations thereon of a variety of other items to be displayed in conjunction with the items on said primary carrier and visible through other portions of said transparent representation, said primary carrier having transparent portions in conjunction with the items thereon through which said other items are visible, combined with signal means on said carriers having elements disposed to be in visible register for predetermined combinations of items.

OSCAR A. BERGMAN.

REFERENCES CITED

The following references are of record in the file of this patent:

UNITED STATES PATENTS

| Number | Name | Date |
|---|---|---|
| 1,832,750 | Stephens | Nov. 17, 1931 |
| 1,966,971 | Rochlus | July 17, 1934 |
| 2,234,609 | Rowe | Mar. 11, 1941 |
| 2,406,495 | Grand-Jean | Aug. 27, 1946 |

FOREIGN PATENTS

| Number | Country | Date |
|---|---|---|
| 349,748 | France | Apr. 11, 1905 |